United States Patent Office 3,360,441
Patented Dec. 26, 1967

3,360,441
MICROBIOLOGICAL SCREENING PROCESS
FOR AFLATOXIN
Harland R. Burmeister, Peoria, Ill., assignor to the United States of America as represented by the Secretary of Agriculture
No Drawing. Filed Sept. 16, 1965, Ser. No. 487,933
4 Claims. (Cl. 195—103.5)

A nonexclusive, irrevocable, royalty-free license in the invention herein described, throughout the world for all purposes of the United States Government, with the power to grant sublicenses for such purposes, is hereby granted to the Government of the United States of America.

This invention relates to a microbiological screening test for aflatoxin. More particularly it relates to the useful discovery that cultures of Bacillus megaterium NRRL B–1368, B. megaterium NRRL B–1370, and B. brevis NRRL B–1874 are inhibited by the presence of only 2 µg. to about 10µg. of aflatoxin per milliliter of culture substrate.

The recent discoveries that certain microorganisms growing on cotton, rice, peanuts, oats, and other crops elaborate aflatoxin and the suspicion that aflatoxin contaminated cottonseed or peanut meals may be responsible for the liver disease and deaths at poultry and fish hatcheries of young ducks, turkeys, and trout, and that aflatoxin may also be a factor in the genesis of some human diseases is responsible for a greatly expanded program of aflatoxin research including research directed toward the discovery of better methods of detecting aflatoxin-contained foodstuffs and animal feeds. Although the duckling test can be used to show relatively massive contaminations of aflatoxin, it is slow, insensitive to small amounts of aflatoxin, and requires the sacrifice and autopsy of the ducklings. Thin-layer chromatographic analyses are employed for microgram quantitations of aflatoxin but chromatographic methods are not conveniently usable for the routine screening of endless samples of possibly contaminated grains, nuts, meals, or other agricultural materials.

Also, relatively large amounts of aflatoxin will have to be made available for long term chronic toxicity studies in experimental animals and fish and for research on means to chemically neutralize or destroy aflatoxin where is is formed. Thus, it will be advantageous to have a screening test that can also indicate unusually heavy concentrations of aflatoxin.

The principal object of this invention is a practical and highly sensitive microbiological process for the screening or detection of aflatoxin-contaminated crops, meals, and other farm products. A further object is a microbiological process in which by employing two organisms having widely different sensitivities to aflatoxin, or with conventional serial dilution techniques an approximate quantitation may be made to accompany any positive screening.

With the above objects in mind, I have tested the aflatoxin sensitivity of well over 300 strains of microorganisms including 30 genera of bacteria, 34 genera of fungi, 4 genera of algae, and 1 protozoan, and have found the vast majority thereof to be unaffected by pure aflatoxin concentrations exceeding even 15 micrograms per milliliter of the culture medium, that only about a dozen of the strains are sensitive to 11.4µg. of mixed pure aflatoxins per milliliter of medium, and that only the species B. megatarium NRRL B–1368, B. megatarium NRRL B–1370, and B. brevis NRRL B–1874 are sensitive to from 2µg. to about 6µg. of the pure aflatoxins per milliliter of culture medium, the relationship of aflatoxin to the grossly visible inhibition and failure of spore cultures thereof to grow being confirmed in all cases by the identicity of bioautographic zones of inhibition of aflatoxin-containing chromatograms previously developed with either of two solvent systems, i.e., chloroform plus 3-percent methanol or water containing 20-percent methanol and 1-percent formic acid.

For convenience, a continuous source of aflatoxin was provided by rice cultured with Aspergillus flavus NRRL–2999, the crude aflatoxins extracted therefrom with chloroform, precipitated with hexane, the solvents steamed off, and the sterile crude aflatoxins suspended in water. Thin-layer chromatographic analysis of the crude aflatoxin precipitate showed it to contain 23.8 percent of aflatoxin $B_1$, 6.3 percent of $B_2$, 6.8 percent of $G_1$, and 0.9 percent of $G_2$ so that 5 micrograms of the crude contained 1.8 micrograms of purified aflatoxin principles, i.e., 1.19 µg. of $B_1$, 0.31 µg. of $B_2$, 0.34 µg. of $G_1$, and 0.045 µg. of $G_2$. Each kilogram of fermented rice yielded 2,563 mg. of crude aflatoxins. The meal from infected cottonseed is known to contain about .145 mg. of the pure aflatoxins per kilogram.

The several bacterial species and strains were cultured as surface streaks on the tryptone-glucose-yeast extract agar (TGY medium) of Haynes et al., Appl. Microbiol. 3:361 (1955) to which had been added aqueous solutions containing none or sufficient crude aflatoxin to provide 5, 10, 15, 20, 30, or 40 µg. per milliliter of inoculated medium, i.e., respectively, zero, 1.8, 3.6, 5.4, 7.2, 10.8, and 14.4 µg. of pure aflatoxins per milliliter of medium.

The microbiological tests were conducted in the following manner. After preparing paper chromatograms as herein described and marking the fluorescent zones under ultraviolet light, the liquified TGY medium containing 1-percent agar and adjusted to pH 6.2 was seeded with 1 percent by weight of a suspension containing $3 \times 10^9$ spores per milliliter of a gram positive bacillus later confined to and selected from the extremely sensitive group consisting of Bacillus megaterium NRRL B–1368, B. megaterium NRRL B–1370, and B. brevis NRRL B–1874, and serially diluted aliquots were then poured into sterile chromatographic trays. The already prepared paper chromatograms were then placed on the hardened surface of the medium contained in the trays and incubated for 18 hours at 30° C. to provide the bioautographs having zones of inhibition corresponding precisely to the previously determined fluorescent zones.

Table 1 lists the aflatoxin sensitive organisms and the minimum inhibitory concentrations of the crude aflatoxins and of the refined mixed aflatoxin principles.

TABLE 1

| Microorganism | Lowest inhibitory conc. of crude aflatoxin in µg per ml. of culture | Same in terms of pure aflatoxin principals |
|---|---|---|
| Bacillus megaterium NRRL B–1368–1 | 5 | 1.8 |
| Bacillus brevis NRRL B–1874 | 10 | 3.6 |
| Bacillus megaterium NRRL B–1370 | 15 | 5.4 |
| NRRL B– | 20 | 7.2 |
| Bacillus cereus NRRL B–614 | 30 | 10.8 |
| Bacillus cereus NRRL B–568 | 40 | 14.4 |

I claim:
1. A microbiological process for detecting the presence of very low levels of aflatoxin contamination in suspected cereal grains and animal feeds comprising extracting a predetermined quantity of the suspected material with chloroform to obtain any aflatoxin present therein, precipitating the crude aflatoxin therefrom with hexane, evaporating the hexane, suspending the crude aflatoxin in sterile water, forming a serial dilution series thereof, adding the said series to respective culture tubes containing a tryptone-glucose-yeast extract agar medium adjusted to pH 6.2 and having dispersed therein 1 percent by weight of a suspension containing $3 \times 10^9$ spores per milliliter of an aflatoxin sensitive microorganism selected from the group consisting of *Bacillus megaterium* NRRL B–1368, *B. megaterium* NRRL B–1370, and *B. brevis* NRRL B–1874, incubating the tubes for 72 hours at 30° C., and inspecting the culture surfaces for evidence of bacterial growth thereon.

2. The process of claim 1 wherein the microorganism is *Bacillus megaterium* NRRL B–1370.

3. The process of claim 1 wherein the microorganism is *Bacillus megaterium* NRRL B–1368.

4. The process of claim 1 wherein the microorganism is *Bacillus brevis* NRRL B–1874.

References Cited

UNITED STATES PATENTS 3,126,325 3/1964 Pool.

ALVIN E. TANENHOLTZ, *Primary Examiner.*